(12) United States Patent
Ekelmans

(10) Patent No.: US 8,361,405 B2
(45) Date of Patent: Jan. 29, 2013

(54) COILED CONVECTIVE HEATING FOR MEMBRANE REACTOR

(75) Inventor: Albertus J. Ekelmans, Houston, TX (US)

(73) Assignee: Air Liquide Process & Construction, Inc., Houston, TX (US)

( * ) Notice: Subject to any disclaimer, the term of this patent is extended or adjusted under 35 U.S.C. 154(b) by 129 days.

(21) Appl. No.: 12/851,003

(22) Filed: Aug. 5, 2010

(65) Prior Publication Data

US 2012/0034138 A1 Feb. 9, 2012

(51) Int. Cl.
*B01J 19/00* (2006.01)
*B01J 8/02* (2006.01)
*B01J 10/00* (2006.01)

(52) U.S. Cl. ........ 422/198; 422/129; 422/200; 422/211; 422/212; 422/240; 422/629; 422/646; 422/649

(58) Field of Classification Search .................. 422/129, 422/198, 200, 211, 212, 222, 240, 646, 649, 422/629
See application file for complete search history.

(56) References Cited

U.S. PATENT DOCUMENTS

| | | | | |
|---|---|---|---|---|
| 4,400,309 A | * | 8/1983 | McMahon et al. | 502/337 |
| 5,110,559 A | * | 5/1992 | Kondo et al. | 422/109 |
| 6,221,117 B1 | | 4/2001 | Edlund et al. | |
| 6,824,593 B2 | * | 11/2004 | Edlund et al. | 96/4 |
| 2005/0276746 A1 | | 12/2005 | Zhang et al. | |

OTHER PUBLICATIONS

PCT/US2011/046421, International Search Report and Written Opinion dated Oct. 18, 2011.

* cited by examiner

*Primary Examiner* — Walter D Griffin
*Assistant Examiner* — Lessanework Seifu
(74) *Attorney, Agent, or Firm* — Justin K. Murray; Elwood L. Haynes

(57) ABSTRACT

A reactor vessel for subjecting a first gas and a second gas to a chemical reaction to produce a third gas is provided. The reactor vessel includes a catalyst bed, an inlet for receiving the first gas and the second gas, and a first outlet for discharging the third gas. The first outlet includes a selective microporous conduit to separate the third gas from products of incomplete reaction or unreacted first gas and unreacted second gas. A second outlet for discharging one or more of the following: unseparated third gas is also included in this invention. The products of incomplete reaction, unreacted first gas, or unreacted second gas are removed from the system. At least one helical tube is disposed within the reactor vessel and in direct contact with the catalyst bed. The helical tube has an inlet end communicating with a hot gas source, and an outlet end exhausting cooled gas. Indirect heat exchange between the helical tube and the first and second gas, promoted by the catalyst, generates the third gas.

15 Claims, 9 Drawing Sheets

COILED CONVECTIVE HEATING FOR MEMBRANE REACTOR

BACKGROUND

A membrane reactor is a piece of chemical equipment that combines a catalyst-filled reaction chamber with a membrane to add reactants or remove products of the reaction. Chemical reactors making use of membranes are usually referred to as membrane reactors. Membrane reactors achieve efficiencies by combining in one unit a reactor that generates a product with a semipermeable membrane that extracts it. The result is a more compact design plus greater conversion. Removal of a product increases the residence time for a given volume of reactor and drives equilibrium-limited reactions towards completion. Another advantage of membrane reactors is that they expand the allowed range of temperatures and pressures for a reaction. Membrane reactors fundamentally change the pressure dependence of conversion in gas phase decomposition reactions so that the reactions are preferentially performed at high pressures rather than low. Higher pressures allow much smaller reactors and more efficient purification. Membrane reactors can be advantageous also for sequential endothermic and exothermic reactions, by using the product extraction to promote heat transfer. The net result is smaller reactors, lower capital costs, and often fewer side-reactions.

While numerous systems combining the reforming and purification processes have been proposed, it is common to encounter heat transfer problems because of the highly endothermic nature of the reaction network which necessitates a large heat transfer area. It is the object of the present invention to address this issue of convective heat transfer within a membrane reactor.

SUMMARY

In one embodiment of the present invention, a reactor heat delivery apparatus, comprising at least one helical tube disposed within a reaction zone and in direct contact with a catalytic means is presented.

In another embodiment of the present invention a system of helical tubes in direct contact with a catalyst bed for subjecting a first gas and a second gas to a chemical reaction to produce a third gas, the system comprising: at least one helical tubes disposed within a reaction zone and in direct contact with a catalyst bed, the helical tubes having, an inlet end communicating with a hot gas or liquid source, an outlet end exhausting cooled gas, wherein indirect heat exchange between the helical tube and the first and second gas, promoted by the catalyst, generates the third gas is presented.

In another embodiment of the present invention a reaction zone for subjecting a first gas and a second gas to a chemical reaction to produce a third gas, the reactor zone comprising: a catalyst bed, an inlet for receiving the first gas and the second gas, an outlet for discharging the third gas; and at least one helical tube disposed within the reaction zone and in direct contact with the catalyst bed, the helical tube having an inlet end communicating with a hot gas or liquid source, an outlet end exhausting cooled gas, wherein indirect heat exchange between the helical tube and the first and second gas, promoted by the catalyst, generates the third gas is presented.

In another embodiment of the present invention, a reactor vessel for subjecting a first gas and a second gas to a chemical reaction to produce a third gas, the reactor vessel comprising: a catalyst bed, an inlet for receiving the first gas and the second gas, a first outlet for discharging the third gas, wherein the first outlet comprises a selective microporous conduit to separate the third gas from products of incomplete reaction or unreacted first gas and unreacted second gas; a second outlet for discharging one or more of the following: unseparated third gas, the products of incomplete reaction, unreacted first gas, or unreacted second gas, and at least one helical tube disposed within the reactor vessel and in direct contact with the catalyst bed, the helical tube having an inlet end communicating with a hot gas source, an outlet end exhausting cooled gas, wherein indirect heat exchange between the helical tube and the first and second gas, promoted by the catalyst, generates the third gas is presented.

DESCRIPTION OF PREFERRED EMBODIMENTS

Figure 1:
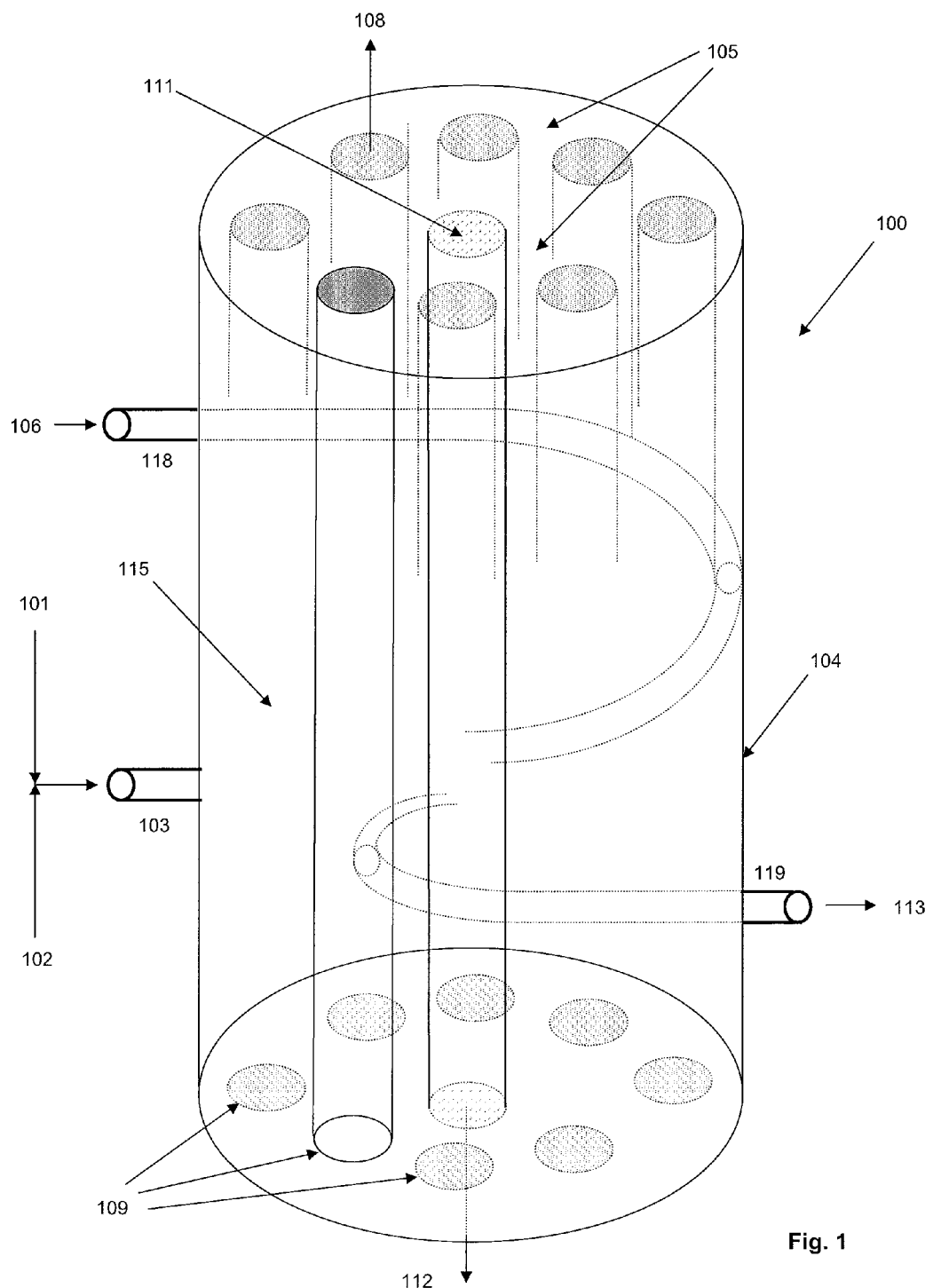
FIG. 1 illustrates an overall representation of one embodiment of the present invention.
Figure 2:
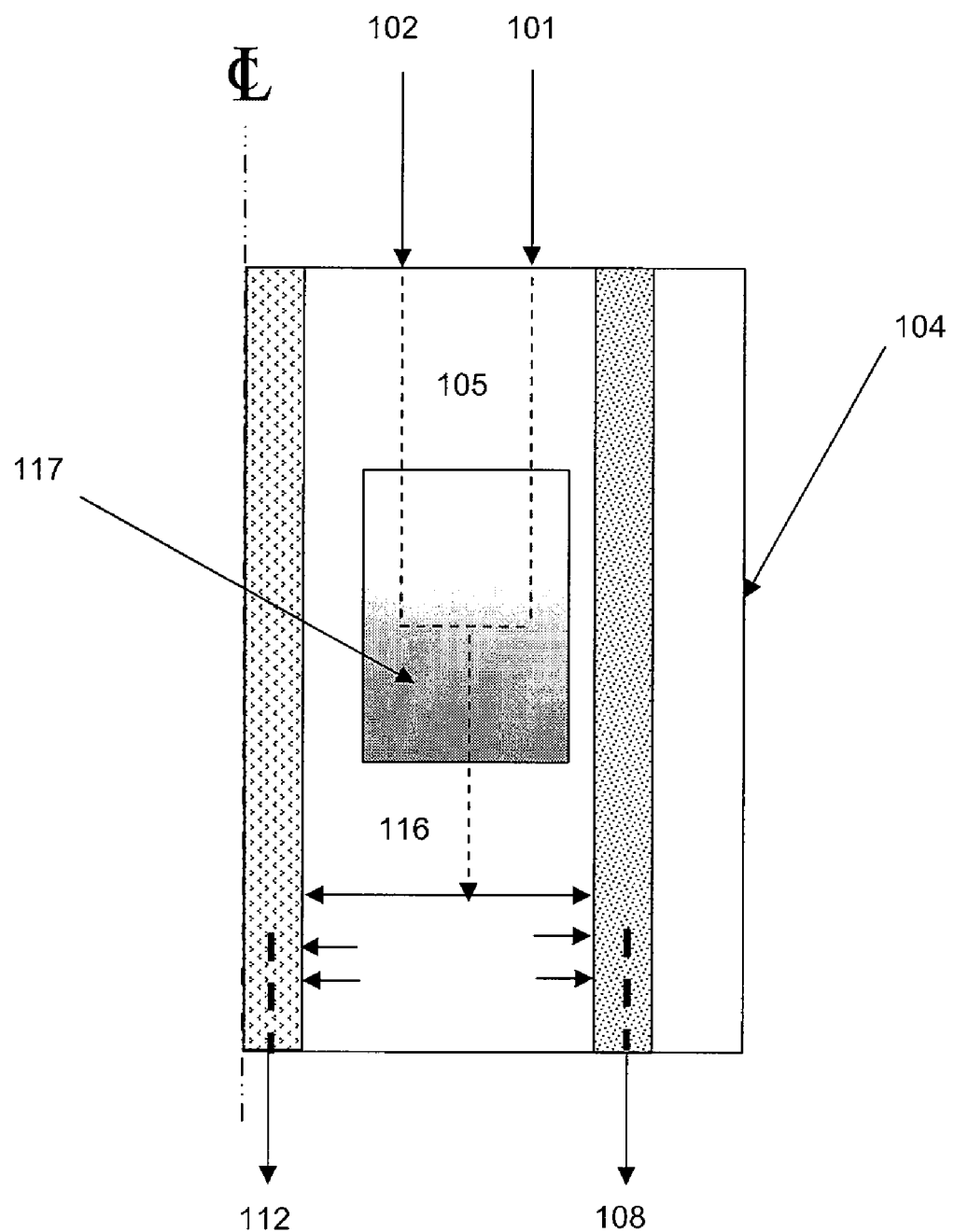
FIG. 2 illustrates the reactor zone and the path of the components of the third gas stream, in accordance with one embodiment of the present invention.

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to FIGS. 1-11, the invention is a coiled convective heating device for membrane reactors 100. In the interest of convenience and clarity, the elements maintain a consistent numbering scheme throughout all figures.

In overview, in one embodiment of the present invention, a first gas stream 101 and a second gas stream 102 combine to form a reformate inlet gas, which is introduced to vessel 104 by means of conduit 103. the reformate inlet gas encounters hot catalyst 105 thereby producing a third gas stream 116. The third gas stream 116 encounters one or more separation devices 109 which selectively separate hydrogen, thereby producing a hydrogen rich product stream 108. Remainder stream 112, which is hydrogen poor, exits vessel 104 by means of porous conduit 111. The heat utilized by gas stream 101 and gas stream 102, along with catalyst 104, to produce the third gas stream 116, is provided by hot combustion product stream 106, which is introduced into vessel 104 by means of first coiled convective heating device 107. After extending most of the length of vessel 104, first coiled convective heating device 107 then extends radially inward to intersect with a second coiled convective heating device 114. Second coiled convective heating device 114 then extends most of the length of vessel 104, after which the cooled combustion products stream 113 exits vessel 104.

In one embodiment of the present invention, at least one helical tube 107, 114, is disposed within a reactor zone 117 of a reactor heat delivery apparatus 100, where it is in direct contact with a catalytic means 105. The helical tube 107, 114 is in fluid communication with a hot gas or liquid source 106. The hot gas 106 may be the product of an upstream combustion process (not shown). The catalytic means 105 is heated by the helical tube 107, 114. The heated catalytic means 105 encourages a reaction between a first gas stream 101 and a second gas 102 thereby producing a third gas 116. The first gas 101 is a hydrocarbon and the second gas is steam 102. The third gas stream 116 may be syngas, a gaseous mixture that contains hydrogen amongst other gases.

In one embodiment of the present invention, a system of helical tubes 107, 114 is in direct contact with a catalyst bed 105 to subject a first gas stream 101 and a second gas stream 102 to a chemical reaction to produce a third gas 116. At least one helical tube 107, 114 is disposed within a reaction zone 117 and in direct contact with a catalyst bed 105, the helical tubes 107, 114 having an inlet end 118 communicating with a hot gas or liquid source, an outlet end 119 exhausting cooled gas, where indirect heat exchange between the helical tube 107, 114 and the first gas 101 and second gas 102, promoted by the catalyst 105, generates the third gas 116. The syngas may be primarily composed of hydrogen and carbon monoxide. The hydrogen may have a purity of greater than about 70%. The hydrogen may have a purity of greater than about 98%. The hot gas source may be a combustion means (not shown). There may be at least 2 or more sets of helical tubes.

In one embodiment of the present invention, a reaction zone 117 for subjecting a first gas stream 101 and a second gas stream 102 to a chemical reaction to produce a third gas stream 116, the reactor zone 117 includes: a catalyst bed 105, an inlet 118 for receiving the first gas stream 101 and the second gas stream 102, an outlet 119 for discharging the third gas stream 116; and at least one helical tube 107, 114 disposed within the reaction zone 117 and in direct contact with the catalyst bed 105, the helical tube 107, 114 having an inlet end 118 communicating with a hot gas or liquid source (not shown), an outlet end 119 exhausting cooled gas, wherein indirect heat exchange between the helical tube 107, 114 and the first gas stream 101 and second gas stream 102, promoted by the catalyst 105, generates the third gas 116. The first coiled convective heating device 107 has an inner radius $r_2$ that is greater than the outer radius $r_3$ of the second coiled convective heating device 114. The exit of the first coiled convective heating device 107 is in fluid connection with the inlet to the second coiled convective heating device 114. The coils of the first coiled convective heating device 107 have a first pitch, and the coils of second coiled convective heating device 114 have a second pitch. The first pitch and the second pitch are such that the overall thermal expansion of the first coiled convective heating device 107 and the second coiled convective heating device 114 are approximately the same.

In one embodiment of the present invention, a reactor vessel 104 for subjecting a first gas stream 101 and a second gas stream 102 to a chemical reaction to produce a third gas stream 116 is provided. The reactor vessel 104 includes a catalyst bed 105, an inlet 103 for receiving the first gas stream and the second gas stream, a first outlet 108 for discharging the third gas stream 116. The first outlet 108 comprises a selective microporous conduit to separate the third gas stream 116 from products of incomplete reaction or unreacted first gas and unreacted second gas. A second outlet 112 for discharging one or more of the following: unseparated third gas, the products of incomplete reaction, unreacted first gas, or unreacted second gas. Also at least one helical tube 107, 114 is disposed within the reactor vessel 104 and in direct contact with the catalyst bed 105. The helical tube 107, 114 has an inlet end 118 communicating with a hot gas source (not shown), an outlet end 119 exhausting cooled gas, and is in indirect heat exchange between the helical tube 104, 114 and the first gas stream 101 and second gas stream 102, promoted by the catalyst 105, thus generating the third gas stream 116.

Figure 9:
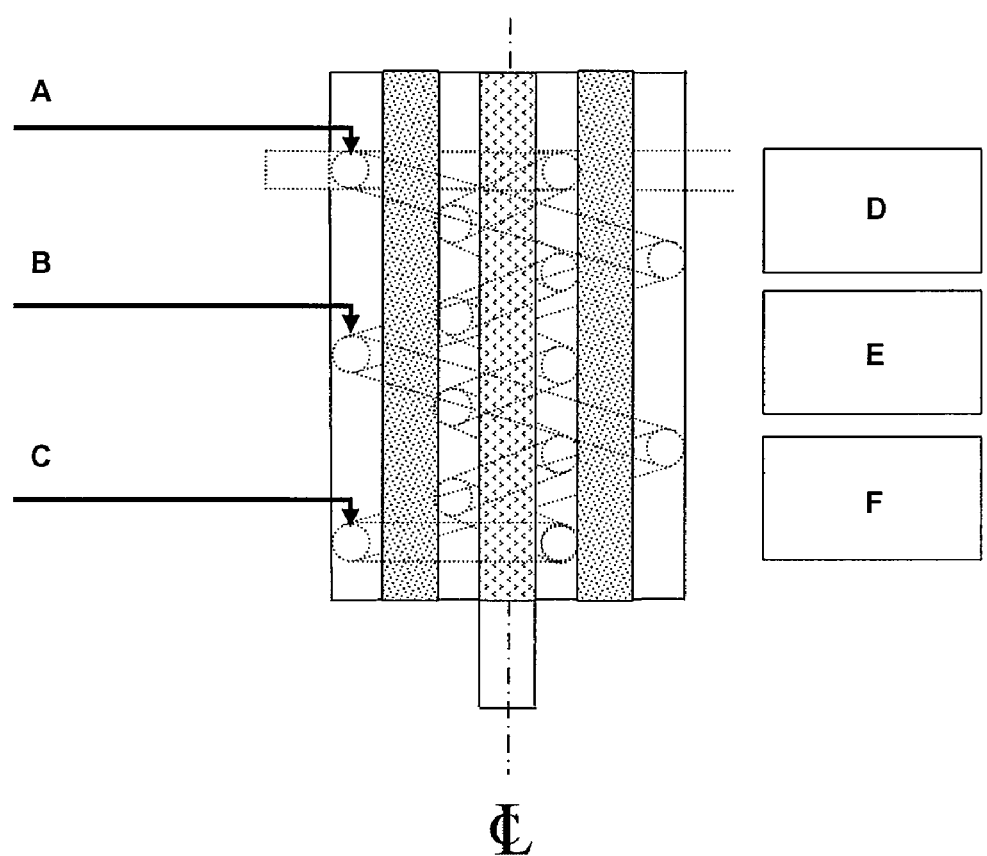
FIG. 9 illustrates locations of support for a predominantly vertical orientation, in accordance with one embodiment of the present invention.

The reactor vessel may have a generally vertical axis of symmetry as represented in FIG. 9. The helical tubes may be generally concentric with the vertical axis of symmetry. The helical tubes may be supported on the upper-most coil A. The helical tubes may be supported on the lower-most coil C. The helical tubes may be supported on the center coil B. The helical tubes may be supported on a coil that is situated in the upper ⅓ of the helix D. The helical tubes may be supported on a coil that is situated in the lower ⅓ of the helix F. The helical tubes may be supported on a coil that is situated in the center ⅓ of the helix E.

Figure 11:
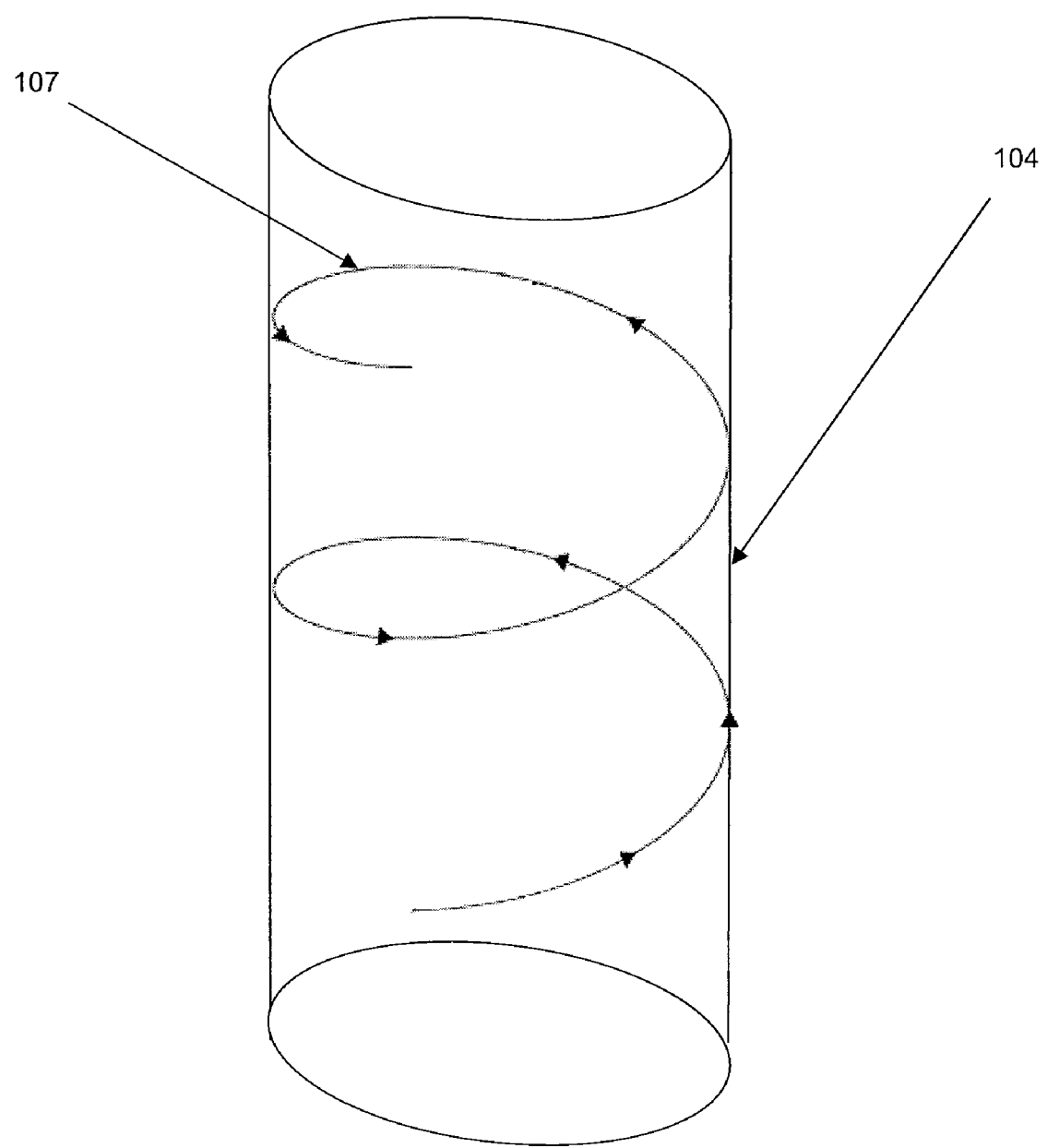
FIG. 11 illustrated helical tubes in the shape of a cylindrical helix, in accordance with one embodiment of the present invention.

The helical tubes are in the shape of a cylindrical helix as represented in FIG. 11. At least one of the helical coils 107, 114 may be contiguous with the reactor 104 for at least 75% of the coil length ($L_1/L>0.75$, $L_2/L>0.75$). The reactor vessel may include an inner exhaust conduit, and at least one of the helical coils proximate to the inner exhaust conduit 111 for at least 75% of the coil length ($L_1/L>0.75$, $L_2/L>0.75$).

Figure 10:
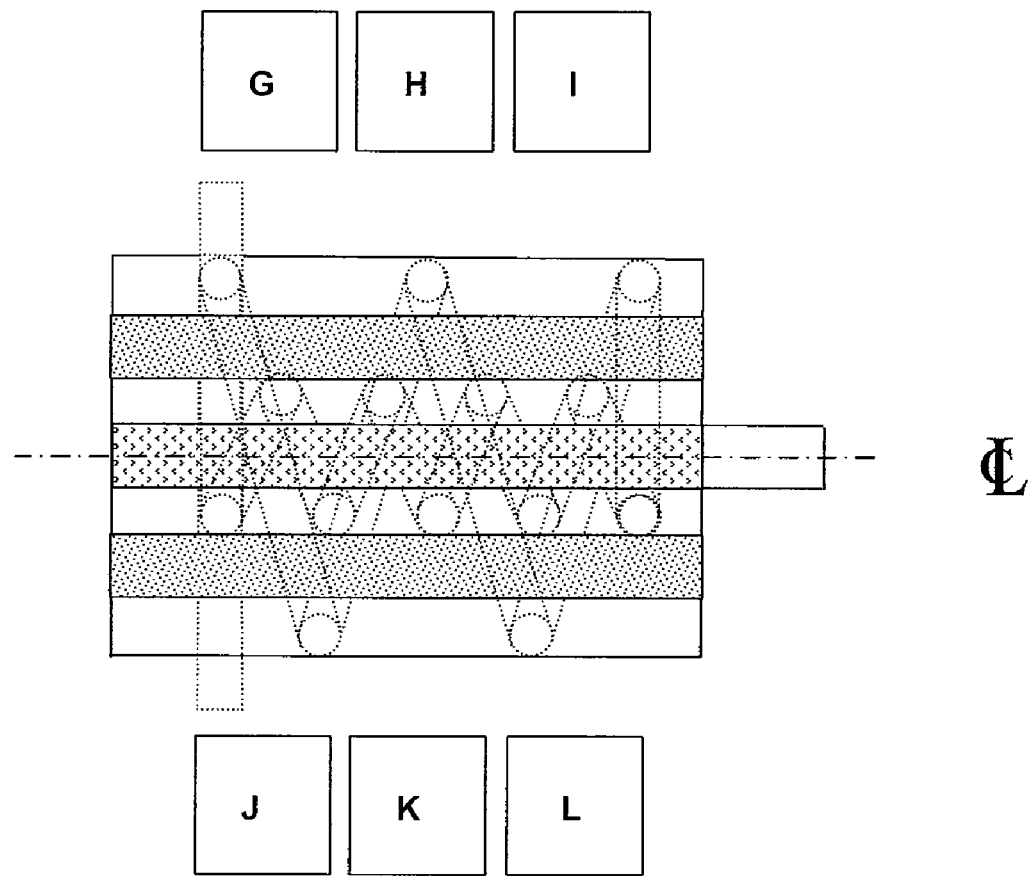
FIG. 10 illustrates locations of support for a predominantly horizontal orientation, in accordance with one embodiment of the present invention.

The reactor vessel may have a generally horizontal axis of symmetry as represented in FIG. 10. The helical tubes may be generally concentric with the horizontal axis of symmetry. The helical tubes may be supported on the upper region of the coils, in the center ⅓ of the helix H. The helical tubes may be supported on the lower region of the coils, in the center ⅓ of the helix K.

Figures 3, 4:
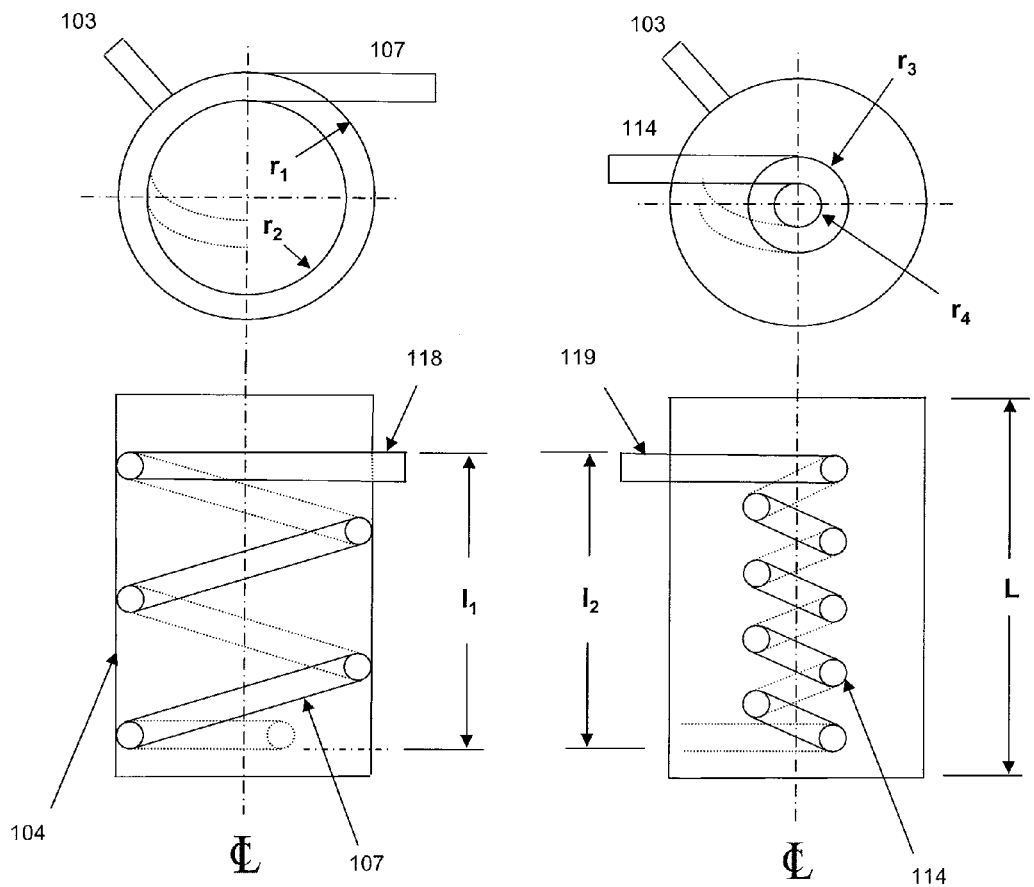
FIG. 3 illustrates the spatial relationship of first coiled convective heating device with respect to vessel, in one embodiment of the present invention.
FIG. 4 illustrates the spatial relationship of second coiled convective heating device with respect to vessel, in one embodiment of the present invention.

FIG. 3 illustrates the spatial relationship of first coiled convective heating device 107 with respect to vessel 104, in one embodiment of the present invention. Within vessel 104, first coiled convective heating device 107 forms an outer coil. This outer coil is generally in close proximity to the shell of vessel 104, and is coaxially aligned with vessel 104. The first coiled convective heating device 107 may be at least partially described by an outer radius $r_1$, and an inner radius $r_2$. Thus, $r_1$ is approximately equal to the inner radius of vessel 104. The first coiled convective heating device 107 may also be at least partially described by a length $l_1$. The overall length of vessel 104 may be characterized as L, and the length $l_1$ of the first coiled convective heating device 107 may be less than 90% of L. The length $l_1$ of the first coiled convective heating device 107 may be less than 75% of L.

FIG. 4 illustrates the spatial relationship of second coiled convective heating device 114 with respect to vessel 104, in one embodiment of the present invention. Within vessel 104, second coiled convective heating device 114 forms an inner coil. This inner coil is positioned inside first coiled convective heat device 107, and is coaxially aligned with vessel 104. The second coiled convective heating device 114 may be at least partially described by an outer radius $r_3$, and an inner radius $r_4$. The second coiled convective heating device 114 may also be at least partially described by a length $l_2$. The overall length of vessel 104 may be characterized as L, and the length $l_2$ of the second coiled convective heating device 114 may be less than 90% of L. The length $l_2$ of the second coiled convective heating device 114 may be less than 75% of L. The length $l_1$ of the first coiled convective heating device 107 may be equal to the length $l_2$ of the second coiled convective heating device 114.

Figure 5:
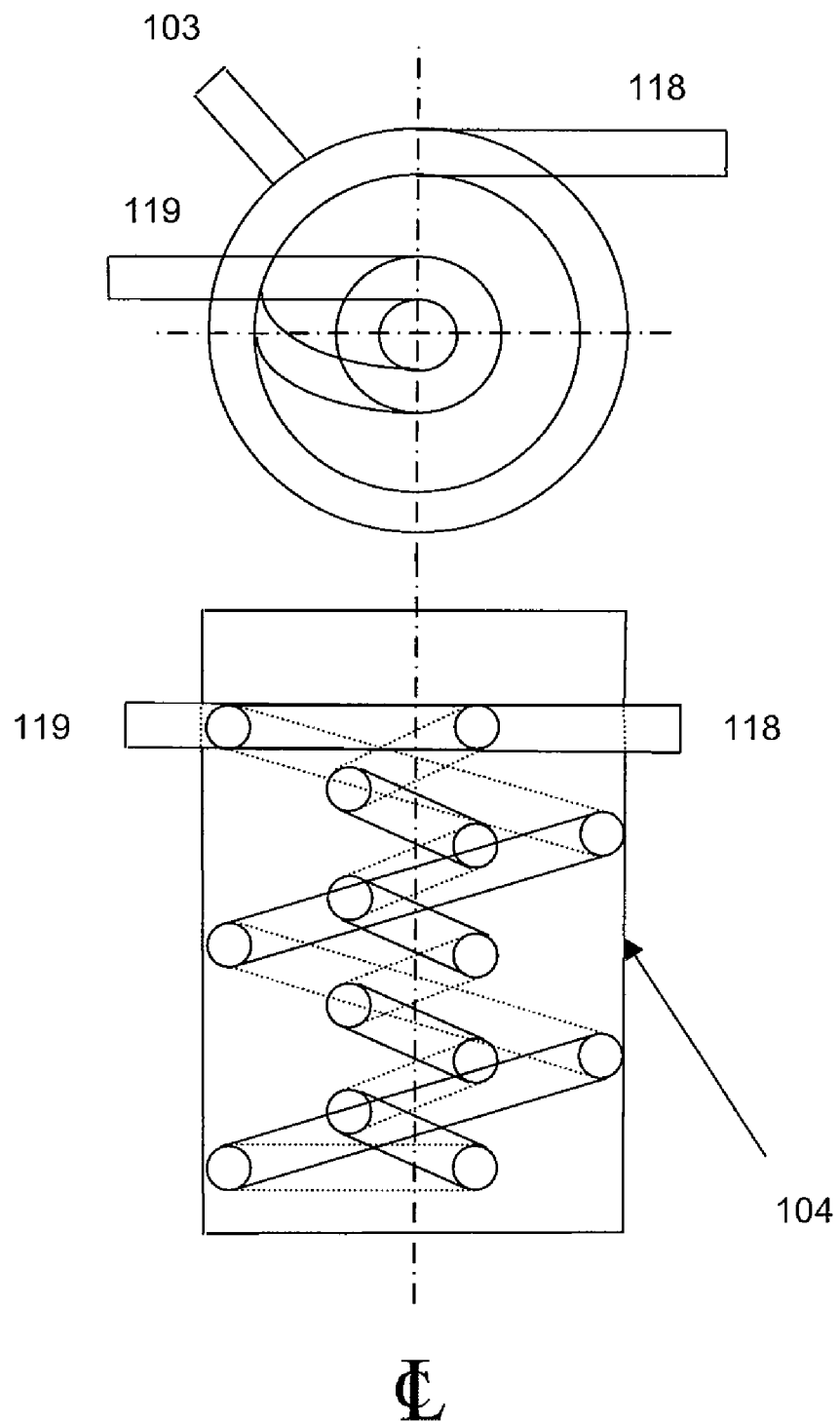
FIG. 5 illustrates the spatial relationship of first coiled convective heating device with respect to vessel and second coiled convective heating device.

FIG. 5 illustrates the spatial relationship of first coiled convective heating device 107 with respect to vessel 104 and second coiled convective heating device 114.

Figures 6, 7:
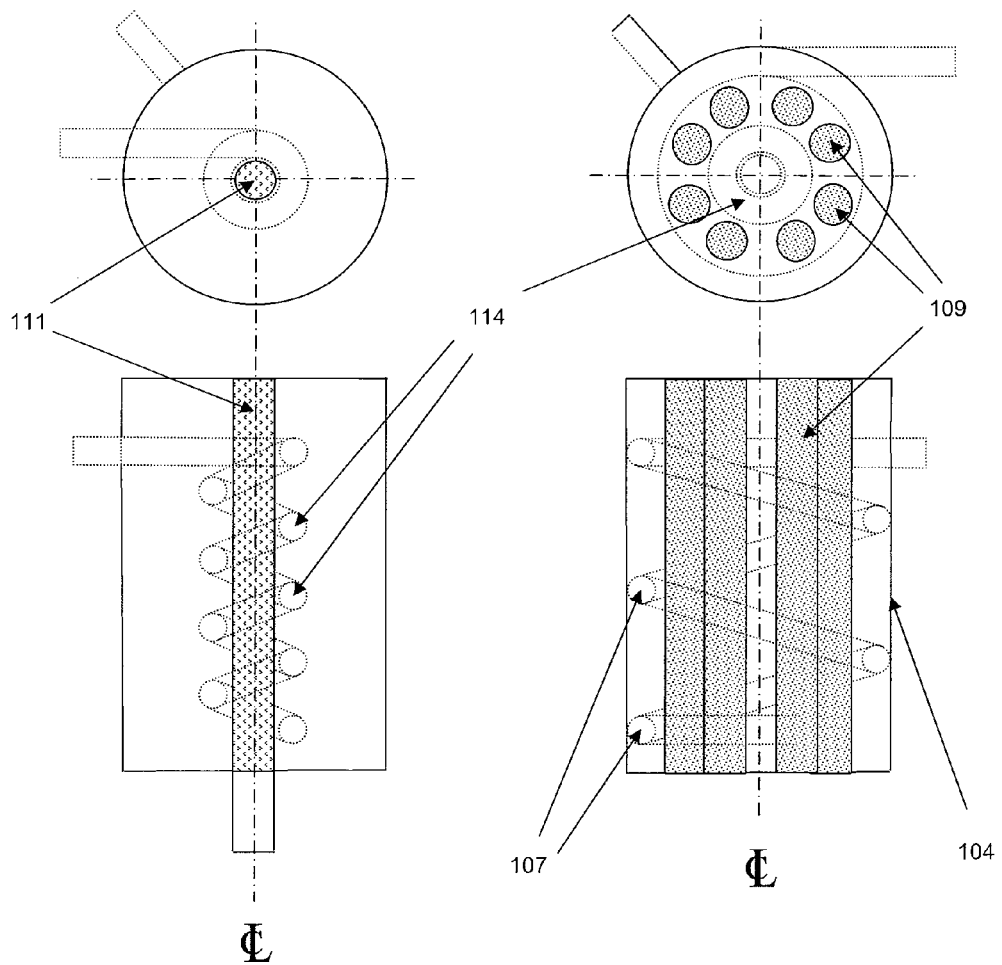
FIG. 6 illustrates the spatial relationship between porous conduit and second coiled convective heating device.
FIG. 7 illustrates the spatial relationship between separation devices, first coiled convective heating device, and second coiled convective heating device.

FIG. 6 illustrates the spatial relationship between porous conduit 111 and second coiled convective heating device 114. The outside diameter of porous conduit 111 is in close proximity to the inner diameter $r_4$ of second coiled convective heating device 114, and is coaxially aligned with vessel 104.

FIG. 7 illustrates the spatial relationship between separation devices 109, first coiled convective heating device 107, and second coiled convective heating device 114. Separation devices 109 are arranged within vessel 105 in such a way that the outermost portion of their outside diameter is in close proximity to the inner diameter $r_2$ of first coiled convective heating device 107, and is coaxially aligned with vessel 104. Separation devices 109 are also arranged within vessel 105 in such a way that the innermost portion of their outside diameter is in close proximity to the outer diameter $r_3$ of second coiled convective heating device 114.

Figure 8:
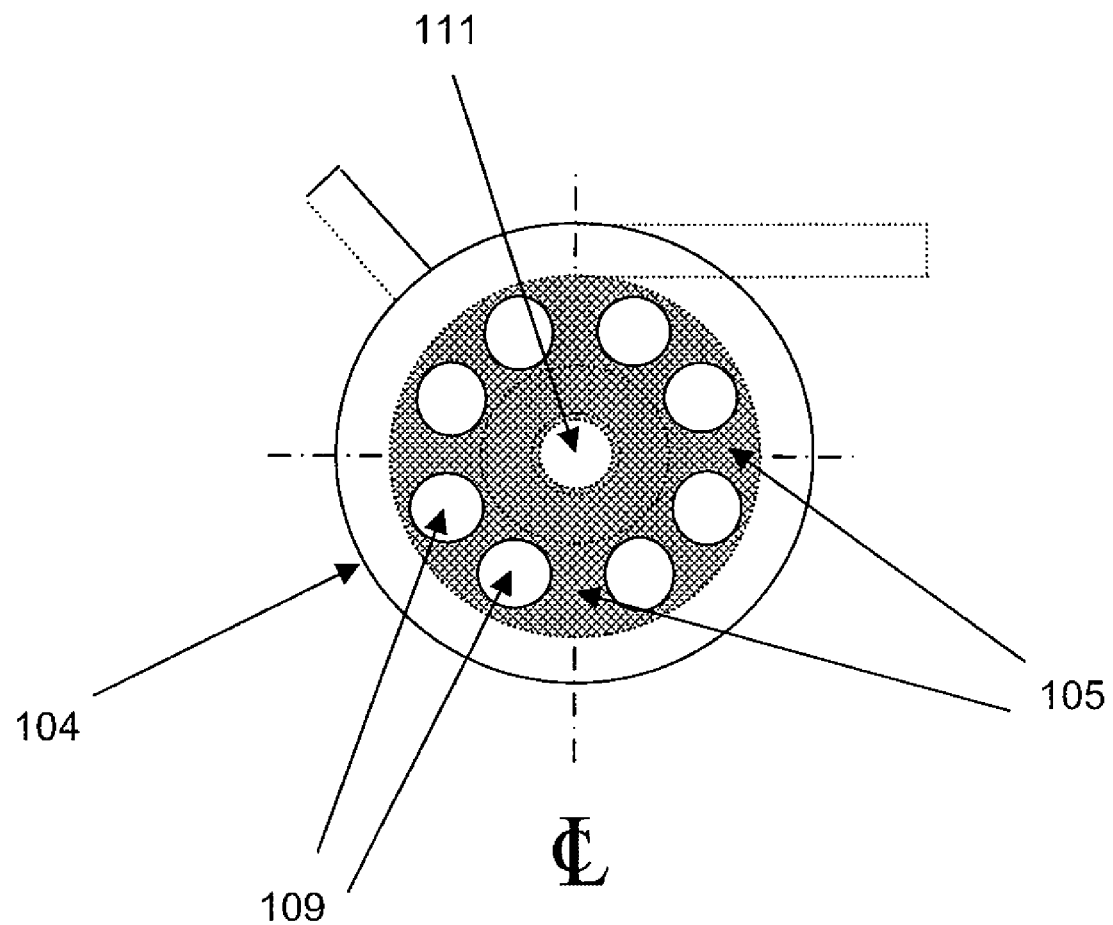
FIG. 8 illustrates the spatial relationship between hot catalyst and first coiled convective heating device, second coiled convective heating device, porous conduit, and separation devices.

FIG. 8 illustrates the spatial relationship between hot catalyst 105 and first coiled convective heating device 107, second coiled convective heating device 114, porous conduit 111, and separation devices 109. Hot catalyst 105 is arranged to fill the interstices within vessel 105 formed amid first coiled convective heating device 107, second coiled convective heating device 114, porous conduit 111, and separation devices 109.

FIG. 9 illustrates a generally vertical axis of symmetry. In such an orientation, the helical coils may be supported at one or more of the following locations. They may be supported by the upper-most coil A, a central coil B, or the lower most coil C. The helical coils may be supported by the upper third of the coil D, the central third of the coil E, or the lower third of the coil F.

FIG. 10 illustrates a generally horizontal axis of symmetry. In such an orientation, the helical coils may be supported at one or more of the following locations. They may be supported by the top side of the coil, by the first third of the coil G, the central third of the coil H, or the lower third of the coil I. They may be supported by the bottom side of the coil, by the first third of the coil J, the central third of the coil K, or the lower third of the coil L.

What is claimed is:

1. A catalytic membrane reactor assembly comprising:
  a vessel having an inner volume defining a reaction zone;
  an inlet configured to receive a reactant gas, wherein the inlet is in fluid communication with the reaction zone;
  a retentate outlet configured to discharge a retentate gas, wherein the retentate outlet is in fluid communication with the reaction zone;
  a plurality of membrane tubes disposed within the reaction zone, wherein the membrane tubes are selectively permeable to a permeate gas;
  a convective coil disposed within the reaction zone, the convective coil configured to heat the reaction zone, wherein a first cylindrical helix of the convective coil is coiled around the plurality of membrane tubes;
  a catalyst disposed within the void space within the inner volume of the vessel, the catalyst configured to enhance a reaction between the reactant gas;
  a hot fluid inlet in fluid communication with the convective coil; and
  a fluid outlet in fluid communication with the convective coil, the fluid outlet configured to remove hot fluid from the convective coil.

2. The catalytic membrane reactor assembly as claimed in claim 1, wherein the convective coil has a second cylindrical helix, wherein the first cylindrical helix has a mean radius larger than the second cylindrical helix.

3. The catalytic membrane reactor assembly as claimed in claim 2, wherein the first cylindrical helix and the second cylindrical helix are concentric.

4. The catalytic membrane reactor assembly as claimed in claim 1, wherein the convective coil forms a first cylindrical helix and a second cylindrical helix, the first cylindrical helix have a first pitch, and second cylindrical helix have a second pitch, wherein the first pitch and the second pitch are such that the overall thermal expansion of the first cylindrical helix and the second cylindrical helix are approximately the same.

5. The catalytic membrane reactor assembly as claimed in claim 1, wherein the reactant gas is selected from a first gas, a second gas, and combinations thereof.

6. The catalytic membrane reactor assembly as claimed in claim 1, Wherein the reactant gas comprises a first gas and a. second gas.

7. The catalytic membrane reactor assembly as claimed in claim 6, wherein the first gas is a hydrocarbon and the second gas is steam.

8. The catalytic membrane reactor assembly as claimed in claim 1, wherein the permeate gas is hydrogen.

9. The catalytic membrane reactor assembly as claimed in claim 1, wherein the retentate gas comprises carbon monoxide.

10. The catalytic membrane reactor assembly as claimed in claim 1, wherein the convective coil is not in fluid communication with the reaction zone.

11. The catalytic membrane reactor assembly as claimed in claim 1, wherein the vessel is substantially cylindrical.

12. The catalytic membrane reactor assembly as claimed in claim 1, wherein the height of the convective coil is at least 75% of the length of the vessel.

13. The catalytic membrane reactor assembly as claimed in claim 1, wherein the convective coil is in direct thermal contact with the catalyst.

14. The catalytic membrane reactor assembly as claimed in claim 1, further comprising a porous conduit disposed within the vessel and in fluid communication with the reaction zone and the retentate outlet, wherein the porous conduit is configured to transport the retentate gas from the reaction zone to the retentate outlet.

15. The catalytic membrane reactor assembly as claimed in claim 14, wherein the second cylindrical helix of the convective coil is coiled around the porous conduit.

* * * * *